United States Patent
Zeng et al.

(10) Patent No.: US 12,384,725 B2
(45) Date of Patent: Aug. 12, 2025

(54) METHOD FOR PREPARING BORON CARBIDE MATERIAL

(71) Applicants: Yunnan Huapu quantum Material Co., Ltd, Yunnan (CN); ROI Optoelectronics Technology CO, LTD., Shanghai (CN); Chongqing Institute of East China Normal University, Chongqing (CN); East China Normal University, Shanghai (CN)

(72) Inventors: Heping Zeng, Chongqing (CN); Mengyun Hu, Chongqing (CN); Wei Qiao, Chongqing (CN)

(73) Assignees: YUNNAN HUAPU QUANTUM MATERIAL CO., LTD, Yunnan (CN); ROI OPTOELECTRONICS TECHNOLOGY CO, LTD., Shanghai (CN); CHONGQING INSTITUTE OF EAST CHINA NORMAL UNIVERSITY, Chongqing (CN); EAST CHINA NORMAL UNIVERSITY, Shanghai (CN)

(*) Notice: Subject to any disclaimer, the term of this patent is extended or adjusted under 35 U.S.C. 154(b) by 812 days.

(21) Appl. No.: 17/702,969

(22) Filed: Mar. 24, 2022

(65) Prior Publication Data

US 2022/0306543 A1    Sep. 29, 2022

(30) Foreign Application Priority Data

Mar. 24, 2021    (CN) .......................... 202110310128.8

(51) Int. Cl.
*C04B 35/563*    (2006.01)
*C04B 35/626*    (2006.01)
(Continued)

(52) U.S. Cl.
CPC ...... *C04B 35/563* (2013.01); *C04B 35/62615* (2013.01); *C04B 35/6268* (2013.01);
(Continued)

(58) Field of Classification Search
CPC ............ C04B 35/563; C04B 35/62615; C04B 35/6268; C04B 35/63416;
(Continued)

(56) References Cited

U.S. PATENT DOCUMENTS 4,895,628 A * 1/1990 Knudsen ............... C01B 32/991
204/157.41

FOREIGN PATENT DOCUMENTS

CN    106835261 A    6/2017
CN    112427653 A    3/2021
(Continued)

OTHER PUBLICATIONS

CNIPA, First Office Action for CN Application No. 202110310128.8, Jul. 6, 2022.

*Primary Examiner* — Armand Melendez
(74) *Attorney, Agent, or Firm* — Hodgson Russ LLP

(57) ABSTRACT

A method for preparing a boron carbide material includes: providing raw materials of a boron material, a carbon material and a rare earth oxide, wherein an element molar ratio B:C of the boron material to the carbon material is in a range of 4:1 to 4:7, and the rare earth oxide is in an amount of 5 wt % or less based on a total weight of the raw materials, mixing and milling the raw materials to obtain a mixture, compressing the mixture into a tablet form by a tablet press, and sintering the compressed mixture by a laser, wherein the laser has a laser wavelength of 980 nm, a laser power in a range of 100 to 3000 W, and a laser irradiation time of 3 to 60 s.

15 Claims, 2 Drawing Sheets

(51) Int. Cl.
*C04B 35/634* (2006.01)
*C04B 35/638* (2006.01)

(52) U.S. Cl.
CPC .. *C04B 35/63416* (2013.01); *C04B 35/63456* (2013.01); *C04B 35/638* (2013.01); *C04B 2235/3224* (2013.01); *C04B 2235/786* (2013.01); *C04B 2235/94* (2013.01)

(58) Field of Classification Search
CPC ............ C04B 35/63456; C04B 35/638; C04B 2235/3224; C04B 2235/786; C04B 2235/94; C04B 35/6262; C04B 35/6264; C04B 2235/3225; C04B 2235/3409; C04B 2235/425; C04B 2235/48; C04B 2235/5427; C04B 2235/5436; C04B 2235/6562; C04B 2235/665; Y02P 20/10; C01B 32/991; C01B 32/05; C01P 2002/72
See application file for complete search history.

(56) References Cited

FOREIGN PATENT DOCUMENTS

| | | |
|---|---|---|
| CN | 112522546 A | 3/2021 |
| JP | H03215309 A | 9/1991 |

\* cited by examiner

METHOD FOR PREPARING BORON CARBIDE MATERIAL

CROSS-REFERENCE TO RELATED APPLICATION

This application claims priority to Chinese Patent Application Serial No. 202110310128.8, filed on Mar. 24, 2021, the entire contents of which is incorporated herein by reference.

TECHNICAL FIELD

The present disclosure relates to a field of preparing a boron carbide-based material, and particular to a method for preparing a boron carbide material.

BACKGROUND

Boron carbide ($B_4C$), also known as the black diamond, is a valuable material with desired properties such as low density, high strength, high temperature stability and excellent chemical stability. However, the $B_4C$ powders synthesized by the existing preparation methods have an uneven particle size and a high impurity content, such as coarse particles and single morphology, which makes it difficult to give full play to the good properties of $B_4C$, and thus limits its applications. Therefore, it is still a need to provide a method for preparing a boron carbide material with a simple process, a low energy consumption, a low pollution and a short period.

SUMMARY

The present disclosure seeks to solve at least one of the problems that exist in the related art to at least some extent.

Accordingly, in an aspect, the present disclosure provides in embodiments a method for preparing a method for preparing a boron carbide material, including: providing raw materials of a boron material, a carbon material and a rare earth oxide, mixing and milling the raw materials to obtain a mixture, compressing the mixture into a tablet form by a tablet press, and sintering the compressed mixture by a laser. An element molar ratio B:C of the boron material to the carbon material is in a range of 4:1 to 4:7, and the rare earth oxide is in an amount of 5 wt % or less based on a total weight of the raw materials. The laser has a laser wavelength of 980 nm, a laser power in a range of 100 to 3000 W, and a laser irradiation time of 3 to 60 s.

BRIEF DESCRIPTION OF THE DRAWINGS

These and/or other aspects and advantages of embodiments of the present disclosure will become apparent and more readily appreciated from the following descriptions made with reference to the drawings, in which.

DETAILED DESCRIPTION

Figure 1:
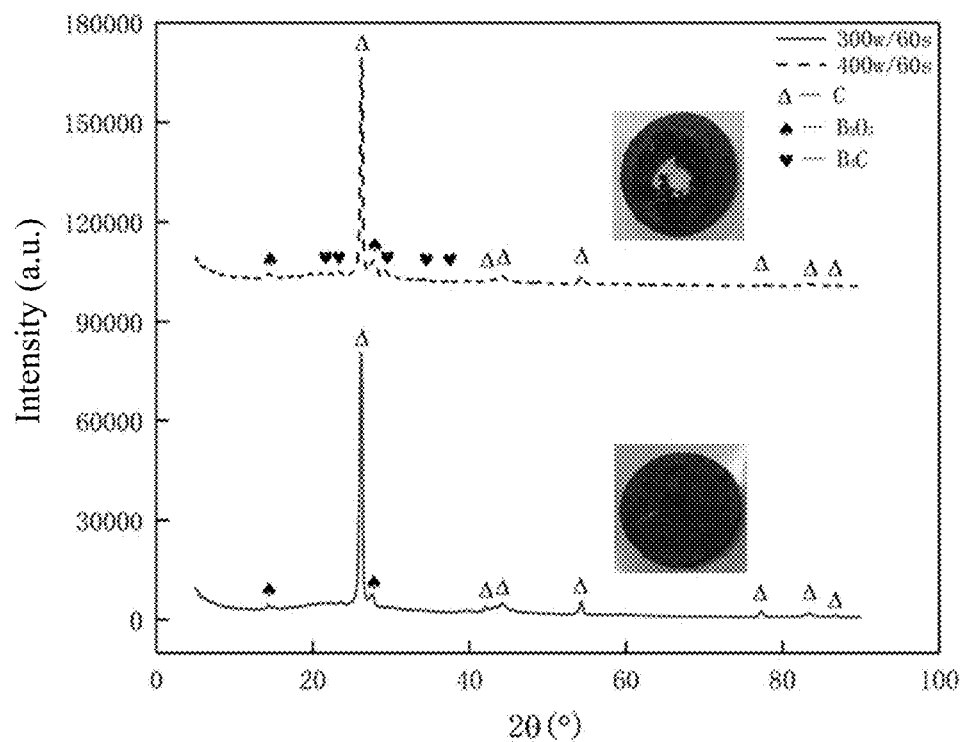
FIG. 1 is a graph showing XRD spectrums and images of samples prepared by a low-power long-time laser sintering according to an embodiment of the present disclosure.

Embodiments of the present disclosure are described in detail below, examples of which are illustrated in the drawings. The embodiments described herein with reference to drawings are explanatory, and used to generally understand the present disclosure. The embodiments shall not be construed to limit the present disclosure.

In embodiments of the present disclosure, a method for preparing a boron carbide material is provided, which exhibits advantages of a simple process, a low energy consumption, a less pollution, a short preparation period.

The method for preparing the boron carbide material includes the following operations.

In operation (1), raw materials of a boron material, a carbon material and a rare earth oxide are provided.

In this operation, the rare earth oxide is added to the raw materials to be reacted, to allow rare earth ions to absorb the energy form the laser, thus realizing energy transfer and a cascade reaction of the raw materials. Further, an element molar ratio B:C of the boron material to the carbon material should be in a range of 4:1 to 4:7. The rare earth oxide is in an amount of 5 wt % or less based on a total weight of the raw materials.

In operation (2) the raw materials are mixed and milled to obtain a mixture.

In operation (3), the mixture is compressed into a tablet form by a tablet press.

In operation (4), the compressed mixture is sintered by a laser. The laser has a laser wavelength of 980 nm, a laser power in a range of 100 to 3000 W, and a laser irradiation time of 3 to 60 s.

The rare earth sensitized ions are excited by the laser resonance, and thus the energy transfer is realized. By continuously supplying the laser energy, the excited ions can be further excited to realize the multi-stage cascade reaction and the energy transfer, thereby activating a high temperature solid-phase reaction of the mixed raw materials to generate boron carbide.

In some embodiments, the rare earth oxide includes at least one of oxides of lanthanide elements (15 lanthanide elements), scandium (Sc) and yttrium (Y). Scandium (Sc) and yttrium (Y) have similar chemical properties to the lanthanide elements. The rare earth oxides can induce the high-temperature solid-phase reaction of the raw materials to generate the boron carbide material.

In some embodiments, the boron material includes at least one of boric acid ($H_3BO_3$), and boron oxide ($B_2O_3$). The carbon material includes at least one of graphite, sucrose, glucose, and graphene.

In some embodiments, the milling is a ball milling, such as a high-energy ball milling. For the ball milling, a polyurethane ball milling tank is used. A medium for the high-energy ball milling is one or more selected from anhydrous ethanol, acetone and deionized water. The high-energy ball milling is performed with a ball milling speed in a range of 300 to 400 rpm, and a ball milling time in a range of 8 to 36 h.

In some embodiments, after the ball milling, the mixture is dried in a blast drying oven and ground into powders. The mixture has a particle size in a range of 45 to 150 μm, which is beneficial to the final preparation of the high-purity boron carbide.

In some embodiments, before compressing the mixture, the method further including: preparing an adhesive having a mass fraction of 1% with an organic colloidal material as a solute and deionized water as a solvent, adding the adhesive to the mixture in a mass ratio of 1:1 to obtain a further mixture, grinding the further mixture for at least 2 h (for example 4 h), perform a granulation to the further mixture, and sieving the granulated mixture with a sieve mesh in a range of 100 to 325 meshes.

After sieving, the sieved mixture is compressed into the tablet form by the tablet press, and before the sintering, the adhesive may be removed by laser irradiation or heating. For example, a tube furnace is used to heat the mixture to remove the adhesive. In an embodiment, the adhesive is removed by heating the compressed mixture to a temperature of 500° C. at a heating rate of 1° C./min, and keeping the temperature for 2 h.

In some embodiments, the organic colloidal material comprises at least one of polyvinyl alcohol (PVA), methoxysilane, polyurethane, and silicone.

In some embodiments, the sintering is performed in vacuum or an atmosphere of air, nitrogen, oxygen or argon. The mixture to be sintered may be in a form of a tablet (by using the tablet press) or powders (by using a synchronous feeding method).

In some embodiments, the laser is a gas laser, a solid laser, a semiconductor diode laser, a fuel laser, a fiber laser, a free electron laser or a diode pumped solid-state laser. The laser has a power in a range of 100 to 3000 W. Under the action of the laser, energy resonance and absorption happen on the sensitized ions, and the energy is further transferred to the reactants.

In some embodiments, the laser has a spot size of 7×7 mm. A size of the laser spot can be adjusted according to a size of the sample. Alternatively, the laser may have a round spot.

In the present disclosure, a laser sintering technology is used, and the reaction process may be controlled by adjusting the ratio of the reaction raw materials, adding a catalytic active material (i.e., a rare earth compound), and an input energy, a sintering time and a spot size of a laser. The raw materials to be reacted are irradiated by the laser, rare earth ions are activated, and a high energy is generated to catalyze a high temperature solid-phase reaction between the reactants. Further, a continuous supply of the laser energy will allow more rare earth ions to be activated for sensitization and multi-stage cascade reactions to achieve boron carbide materials with a low energy consumption.

The properties of boron carbide materials prepared by the present method, such as thickness, crystallinity, lattice type and lattice size, may be controlled by adjusting the laser power, sintering time and spot size. The present method has characteristics of simple process flow, simple device, less environmental requirements, short synthesis period and high utilization rate of raw materials, which may be used in industrial production to realize the preparation of the boron carbide-based materials on a large scale.

In the present disclosure, the rare earth oxide may be $Yb_2O_3$. The three raw materials are weighted in such a manner that the rare earth oxide has an amount of 5% by weight or less, and an element molar ratio B:C of the boron material (e.g., boron oxide) to the carbon material (e.g., carbon powders) is in a range of 4:1 to 4:7. The raw materials are mixed by the high-energy ball milling with the ball milling speed of 300 rpm and the ball milling medium of ethanol. After mixing the materials fully and uniformly, a mixture is obtained. The mixture is dried in an oven at 100° C., ground and sieved a mesh number of 325 mesh. The sieved mixture has a particle size ranging from 45 to 150 μm. Then, the sieved mixture is compressed into tablets by a tablet press, and placed on a laser worktable for sintering. The laser sintering is performed with the laser wavelength of 980 nm, the laser sintering power of 2700 W, the spot size of 7×7 mm, and the sintering time of 3 to 60 s, to realize the laser-activated self-propagating high-temperature solid-phase reaction to prepare boron carbide. The obtained boron carbide has a high purity, a small size, a high density, and a good wear resistance, and is suitable for use in military products such as lightweight armors and bulletproof vests. The present method of the self-propagating preparation activated by the laser sintering has a simple process, a low cost, a short period, a high efficiency, a low environmental pollution, and a low energy consumption, and is suitable for large-scale industrial applications.

Example 1

Raw materials of $B_2O_3$, graphite powders, and $Yb_2O_3$ are weighted in such a manner that a B:C ratio is 4:7 and an amount of $Yb_2O_3$ is 0%, 1%, 3%, and 5% by weight, respectively. The raw materials are mixed fully and uniformly to obtain mixture powders. The mixture powders are milled, dried in an oven at 100° C., and ground. The ground mixture is granulated to obtain particles with a small particle size and a high density. In the process of the granulation, an adhesive having a mass fraction of 1% is prepared with an organic colloidal material of PVA as a solute and deionized water as a solvent. The adhesive is added into the mixture in two or three times. After grinding for 4 hours, the mixture is sieved with a sieve mesh in a range of 100 to 325 mesh, and the particle size of the mixture powders is in a range of 45 to 150 μm. The sieved powders are compressed into tablets by a tablet press, and placed in a muffle furnace to remove the adhesive (at a heating rate of 1° C./min, heating to 500° C. and holding for 2 h). After this, the obtained sample is placed on a laser worktable, and sintered by the laser with a laser wavelength of 980 nm, a laser sintering power of 2600 W, a spot size of 7×7 mm, and a laser irradiation time of 3 to 60 s. The raw material mixture is subjected to a laser-activated self-propagating high-temperature solid-phase reaction, and the product is obtained.

Example 2

Raw materials of $B_2O_3$, graphite powders, and $Yb_2O_3$ are weighted in such a manner that a B:C ratio is 4:7 and an amount of $Yb_2O_3$ is 0%. The raw materials are mixed by a high-energy ball milling with a ball milling speed of 300 rpm, a ball milling period of 12 h and a ball milling medium of ethanol. After mixing the materials fully and uniformly, a mixture is obtained. The mixture is dried in an oven at 100° C., and ground. The ground mixture is granulated to obtain particles with a small particle size and a high density. In the process of the granulation, an adhesive having a mass fraction of 1% is prepared with an organic colloidal material of PVA as a solute and deionized water as a solvent. The adhesive is added into the mixture in two or three times. After grinding for 4 hours, the mixture is sieved with a sieve mesh in a range of 100 to 325 mesh, and the particle size of the mixture powders is in a range of 45 to 150 μm. The sieved powders are compressed into tablets by a tablet press, and placed in a muffle furnace to remove the adhesive (at a heating rate of 1° C./min, heating to 500° C. and holding for 2 h). After this, the obtained sample is placed on a laser worktable, and sintered by the laser with a laser wavelength of 980 nm, a laser sintering power of 300 W or 400 W, a spot size of 7×7 mm, and a laser irradiation time of 60 s. The products are prepared at a low power and a long time, and the XRD spectrums and images of the products are shown in FIG. 1.

Example 3

Figure 2:
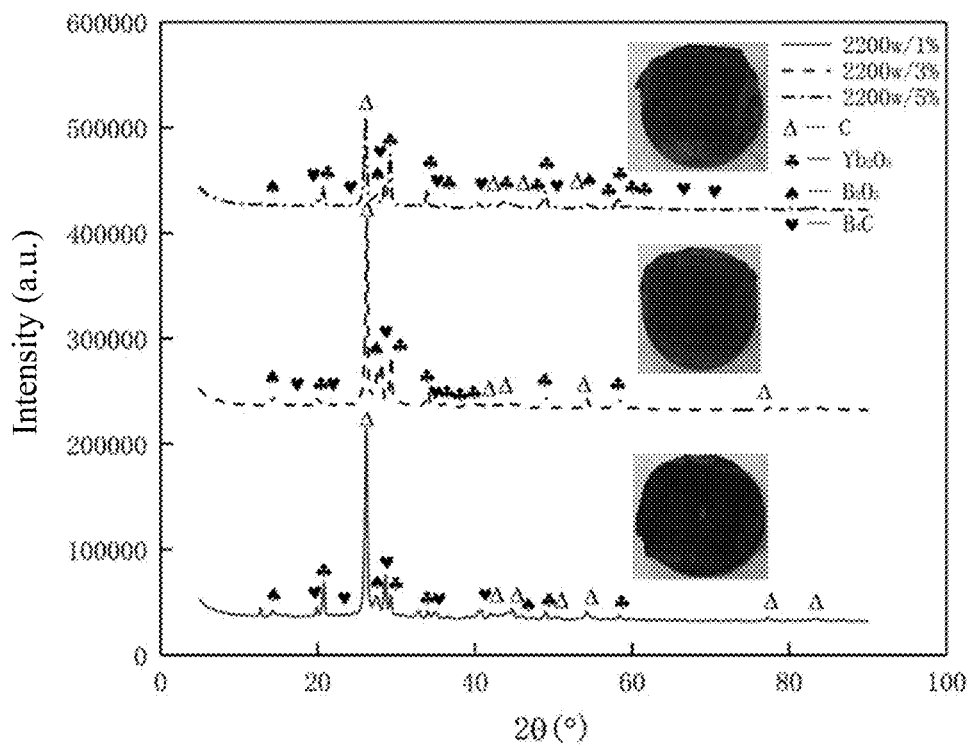
FIG. 2 is a graph showing XRD spectrums and images of samples having different $Yb_2O_3$ contents according to an embodiment of the present disclosure.

Raw materials of $B_2O_3$, sucrose, and $Yb_2O_3$ are weighted in such a manner that a B:C ratio is 4:1 and an amount of $Yb_2O_3$ is 1%, 3%, and 5% by weight, respectively. The raw materials are mixed by a high-energy ball milling with a ball milling speed of 300 rpm, a ball milling period of 12 h and a ball milling medium of ethanol. After mixing the materials fully and uniformly, a mixture is obtained. The mixture powders are milled, dried in an oven at 100° C., ground, and sieved with a sieve mesh in a range of 100 to 325 mesh, and the particle size of the mixture powders is in a range of 45 to 150 μm. The sieved powders are compressed into tablets by a tablet press, and placed on a laser worktable, and sintered by the laser with a laser wavelength of 980 nm, a laser sintering power of 2200 W, a spot size of 7×7 mm, and a laser irradiation time of 3 s. FIG. 2 shows XRD spectrums and images of the prepared samples having different $Yb_2O_3$ contents in this Example.

Example 4

Figure 3:
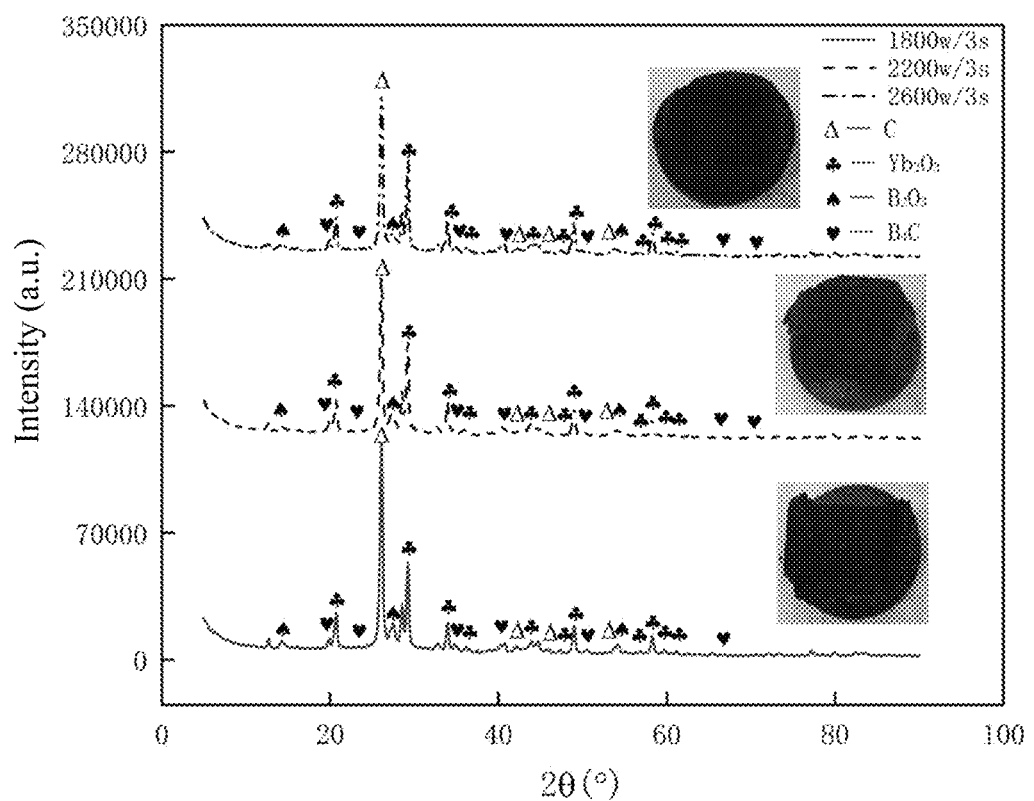
FIG. 3 is a graph showing XRD spectrums and images of samples prepared by laser sintering at different laser powers according to an embodiment of the present disclosure.

Raw materials of $B_2O_3$, glucose, and $Yb_2O_3$ are weighted in such a manner that a B:C ratio is 4:1 and an amount of $Yb_2O_3$ is 3% by weight. The raw materials are mixed by a high-energy ball milling with a ball milling speed of 300 rpm, a ball milling period of 12 h and a ball milling medium of ethanol. After mixing the materials fully and uniformly, a mixture is obtained. The mixture powders are dried in an oven at 100° C., ground, and sieved with a sieve mesh in a range of 100 to 325 mesh, and the particle size of the mixture powders is in a range of 45 to 150 μm. The sieved powders are compressed into tablets by a tablet press, and placed on a laser worktable, and sintered by the laser with a laser wavelength of 980 nm, a laser sintering power of 1800 W, 2200 W or 2600 W, a spot size of 7×7 mm, and a laser irradiation time of 3 s. FIG. 3 shows XRD spectrums and images of samples prepared by laser sintering at different laser powers in this Example.

Example 5

Figure 4:
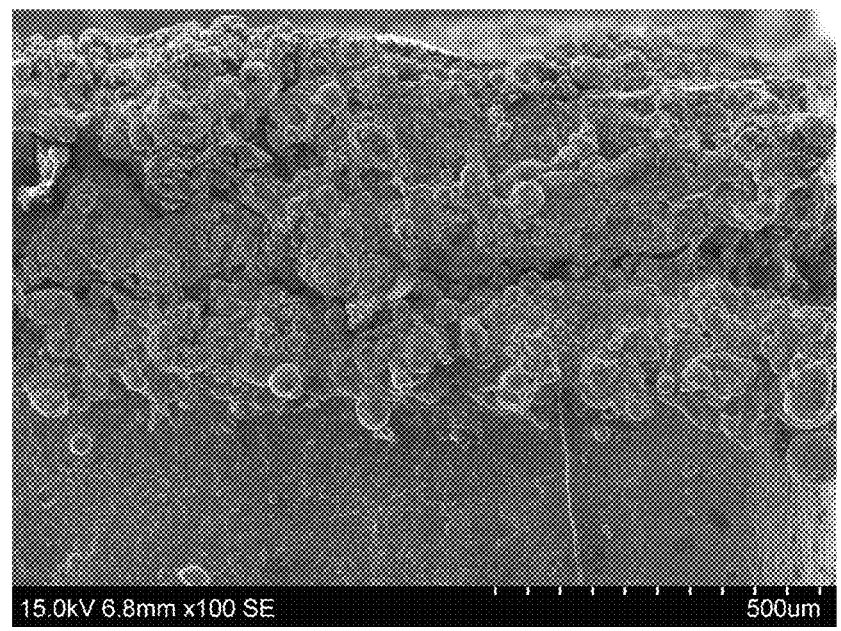
FIG. 4 is an SEM image of a boron carbide material on a stainless steel substrate prepared by laser sintering with a laser power of 1700 W according to an embodiment of the present disclosure.

Raw materials of $B_2O_3$, graphite powders, and $Yb_2O_3$ are weighted in such a manner that a B:C ratio is 4:7 and an amount of $Yb_2O_3$ is 3% by weight. The raw materials are mixed fully and uniformly to obtain mixture powders. The mixture powders are milled, dried in an oven at 100° C., and ground. The ground mixture is granulated to obtain particles with a small particle size and a high density. In the process of the granulation, an adhesive having a mass fraction of 1% is prepared with an organic colloidal material of PVA as a solute and deionized water as a solvent. The adhesive is added into the mixture in two or three times. After grinding for 4 hours, the mixture is sieved with a sieve mesh in a range of 100 to 325 mesh, and the particle size of the mixture powders is in a range of 45 to 150 μm. The sieved powders are compressed into tablets by a tablet press, and placed in a muffle furnace to remove the adhesive (at a heating rate of 1° C./min, heating to 500° C. and holding for 2 h). After this, the obtained sample is placed on a laser worktable, and sintered by the laser with a laser wavelength of 980 nm, a laser sintering power of 1700 W, a spot size of 7×7 mm, and a laser irradiation time of 3 to 60 s. The raw material mixture is subjected to a laser-activated self-propagating high-temperature solid-phase reaction, and the product sample is obtained. During the sintering, a stainless steel substrate is used. FIG. 4 is an SEM image of boron carbide on the stainless steel substrate prepared in this Example.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. Thus, the appearances of above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples described in the specification, as well as features of embodiments or examples, without conflicting, may be combined by one skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for preparing a boron carbide material, comprising:
   providing raw materials of a boron material, a carbon material and a rare earth oxide, wherein an element molar ratio B:C of the boron material to the carbon material is in a range of 4:1 to 4:7, and the rare earth oxide is in an amount of 5 wt % or less based on a total weight of the raw materials,
   mixing and milling the raw materials to obtain a mixture,
   compressing the mixture into a tablet form by a tablet press, and
   sintering the compressed mixture by a laser, wherein the laser has a laser wavelength of 980 nm, a laser power in a range of 100 to 3000 W, and a laser irradiation time of 3 to 60 s.

2. The method according to claim 1, wherein the rare earth oxide comprises at least one of oxides of lanthanide elements, scandium (Sc) and yttrium (Y).

3. The method according to claim 1, wherein the boron material comprises at least one of boric acid ($H_3BO_3$), and boron oxide ($B_2O_3$).

4. The method according to claim 1, wherein the carbon material comprises at least one of graphite, sucrose, glucose, and graphene.

5. The method according to claim 1, wherein the milling is a high-energy ball milling.

6. The method according to claim 5, wherein a medium for the high-energy ball milling is one or more selected from anhydrous ethanol, acetone and deionized water.

7. The method according to claim 5, wherein the high-energy ball milling is performed with a ball milling speed in a range of 300 to 400 rpm, and a ball milling time in a range of 8 to 36 h.

8. The method according to claim 1, wherein the mixture has a particle size in a range of 45 to 150 μm.

9. The method according to claim 1, wherein before compressing the mixture, the method further comprises:
preparing an adhesive having a mass fraction of 1% with an organic colloidal material as a solute and deionized water as a solvent,
adding the adhesive to the mixture in a mass ratio of 1:1 to obtain a further mixture,
grinding the further mixture for at least 2 h,
perform a granulation to the further mixture, and
sieving the granulated mixture with a sieve mesh in a range of 100 to 325 meshes.

10. The method according to claim 9, wherein after sieving, the sieved mixture is compressed into the tablet form by the tablet press, and before the sintering, the method further comprises:
removing the adhesive by laser irradiation or heating.

11. The method according to claim 10, wherein removing the adhesive by heating comprises:
removing the adhesive by heating the compressed mixture to a temperature of 500° C. at a heating rate of 1° C./min, and keeping the temperature for 2 h.

12. The method according to claim 9, wherein the organic colloidal material comprises at least one of polyvinyl alcohol (PVA), methoxysilane, polyurethane, and silicone.

13. The method according to claim 1, wherein the sintering is performed in vacuum or an atmosphere of air, nitrogen, oxygen or argon.

14. The method according to claim 1, wherein the laser is a gas laser, a solid laser, a semiconductor diode laser, a fuel laser, a fiber laser, a free electron laser or a diode pumped solid-state laser.

15. The method according to claim 1, wherein the laser has a spot size of 7×7 mm.

* * * * *